(12) United States Patent
Müller et al.

(10) Patent No.: US 12,179,905 B2
(45) Date of Patent: Dec. 31, 2024

(54) CLADDING ELEMENT HAVING A HEATING LAYER IN A SANDWICH CONSTRUCTION

(71) Applicant: Airbus Operations GmbH, Hamburg (DE)

(72) Inventors: Rainer Müller, Rosengarten (DE); Andreas Baatz, Sauensiek (DE); Dietmar Voelkle, Biberach (DE); Florian Hesselbach, Blaustein (DE); Tobias Lechner, Mönchsroth (DE); Norbert Staudigel, Neu-Ulm (DE); Benjamin Joemann, Leopoldshöhe (DE)

(73) Assignee: Airbus Operations GmbH, Hamburg (DE)

( * ) Notice: Subject to any disclaimer, the term of this patent is extended or adjusted under 35 U.S.C. 154(b) by 1072 days.

(21) Appl. No.: 16/691,821

(22) Filed: Nov. 22, 2019

(65) Prior Publication Data

US 2020/0164958 A1 May 28, 2020

(30) Foreign Application Priority Data

Nov. 23, 2018 (DE) ...................... 10 2018 009 218.7

(51) Int. Cl.
*B64C 1/40* (2006.01)
*B32B 3/12* (2006.01)
(Continued)

(52) U.S. Cl.
CPC .................. *B64C 1/40* (2013.01); *B32B 3/12* (2013.01); *B32B 5/06* (2013.01); *B32B 5/18* (2013.01);
(Continued)

(58) Field of Classification Search
None
See application file for complete search history.

(56) References Cited

U.S. PATENT DOCUMENTS

| 3,697,728 A | 10/1972 | Stirzenbecher |
| 6,834,159 B1 * | 12/2004 | Schramm .................. B64C 1/40 244/129.1 |

(Continued)

FOREIGN PATENT DOCUMENTS

| DE | 19918736 A1 | 11/2000 |
| EP | 1 809 073 A1 | 7/2007 |

(Continued)

OTHER PUBLICATIONS

EP 3279055 A1, Alter et al, Feb. 2018, partial translation. (Year: 2018).*

(Continued)

*Primary Examiner* — John J Norton
(74) *Attorney, Agent, or Firm* — KDW Firm PLLC (57) ABSTRACT

A cladding element having a heating layer in a sandwich construction. In the case of a cladding element in a sandwich construction for an interior space of an aircraft, the cladding element includes a core layer and a first cover layer. The first cover layer forms a visible side of the cladding element. An electrically heating layer extends at least across a sub-face of the first cover layer and serves for generating heat for emission through the first cover layer is disposed between the core layer and the first cover layer.

20 Claims, 5 Drawing Sheets

(51) Int. Cl.
    *B32B 5/06*               (2006.01)
    *B32B 5/18*               (2006.01)
    *B32B 7/025*             (2019.01)
    *B32B 7/027*             (2019.01)
    *B32B 17/02*             (2006.01)
    *B64C 1/06*              (2006.01)
    *H05B 3/26*              (2006.01)
    *B64C 1/00*              (2006.01)

(52) U.S. Cl.
    CPC .............. *B32B 7/025* (2019.01); *B32B 7/027* (2019.01); *B32B 17/02* (2013.01); *B64C 1/067* (2013.01); *H05B 3/26* (2013.01); *B32B 2307/304* (2013.01); *B32B 2605/18* (2013.01); *B64C 2001/0072* (2013.01)

(56) References Cited

U.S. PATENT DOCUMENTS

| | | | | |
|---|---|---|---|---|
| 7,785,694 | B2 * | 8/2010 | Muller | A62C 2/06 |
| | | | | 428/209 |
| 11,597,524 | B2 * | 3/2023 | Seidler | H05B 3/267 |
| 2002/0168184 | A1 * | 11/2002 | Meisiek | B64C 1/40 |
| | | | | 392/435 |
| 2006/0138279 | A1 * | 6/2006 | Pisarski | B32B 33/00 |
| | | | | 244/118.5 |
| 2006/0201933 | A1 | 9/2006 | Carpino, II et al. | |
| 2007/0164015 | A1 | 7/2007 | Carpino, II et al. | |
| 2007/0224406 | A1 * | 9/2007 | Busch | B64D 13/08 |
| | | | | 428/292.1 |
| 2009/0236327 | A1 | 9/2009 | Everly et al. | |
| 2011/0100747 | A1 * | 5/2011 | Hoetzeldt | G10K 11/16 |
| | | | | 181/290 |
| 2016/0121993 | A1 * | 5/2016 | Nehring | B32B 5/245 |
| | | | | 244/118.5 |
| 2016/0236780 | A1 * | 8/2016 | Staudigel | B32B 27/304 |
| 2016/0343467 | A1 * | 11/2016 | Wen | H01B 7/0823 |
| 2017/0151753 | A1 * | 6/2017 | Harms | B32B 3/12 |
| 2017/0238369 | A1 | 8/2017 | Owens et al. | |
| 2018/0176989 | A1 * | 6/2018 | Hu | B32B 7/12 |
| 2019/0225317 | A1 * | 7/2019 | Vincitore | H05B 3/28 |
| 2019/0309960 | A1 * | 10/2019 | Hegenbart | F24D 13/024 |
| 2020/0001966 | A1 * | 1/2020 | Krishnappa | B32B 15/20 |
| 2020/0009825 | A1 * | 1/2020 | Waina | B32B 27/08 |
| 2020/0010168 | A1 * | 1/2020 | Hu | B32B 5/02 |
| 2020/0010169 | A1 * | 1/2020 | Slane | B32B 15/14 |
| 2020/0011543 | A1 * | 1/2020 | Hu | H05B 3/28 |
| 2020/0015325 | A1 * | 1/2020 | Zhao | H05B 3/145 |
| 2021/0323651 | A1 * | 10/2021 | Alter | B32B 15/20 |

FOREIGN PATENT DOCUMENTS

| | | | | |
|---|---|---|---|---|
| EP | | 3279055 A1 * | 2/2018 | ........... B32B 27/065 |
| WO | WO 2014/001304 A1 | | 1/2014 | |

OTHER PUBLICATIONS

German Office Action for Application No. 10 2018 009 218.7 dated Sep. 26, 2019.

* cited by examiner

CLADDING ELEMENT HAVING A HEATING LAYER IN A SANDWICH CONSTRUCTION

CROSS-REFERENCE TO RELATED APPLICATION

This application claims priority to German patent application DE 102018009218.7 filed Nov. 23, 2018, the entire disclosure of which is incorporated by reference herein.

TECHNICAL FIELD

The disclosure herein relates to a cladding element in a sandwich construction for an interior space of an aircraft, the cladding element containing a core layer and a first cover layer, wherein the first cover layer in the intended assembled state of the cladding element in the interior space forms a visible side of the cladding element that faces the interior space.

BACKGROUND

In an interior space, in particular of a passenger cabin, of an aircraft, in particular a passenger aircraft, a comfortable indoor climate with regards to temperature is desirable. It is commonplace herein for insulation material (cladding elements, panels, linings) for thermal insulation in relation to the cold external skin of the aircraft to be incorporated between the external skin and the internal wall, or the visible side of the latter.

Compromises can arise herein on account of constraints (insufficient installation space for adequate insulation by way of glass-wool packs, thermal bridges, draft effects). For example, unacceptably low surface temperatures in the airborne state can thus result on a cladding element on account of changes on the aircraft structure and thermal bridges resulting therefrom. For example, adequate insulation material can no longer be incorporated due to the minor installation space.

SUMMARY

It is an object of the disclosure herein to improve thermal comfort for passengers and the crew in the regions.

The object is achieved by a cladding element (also referred to as a panel or a lining) for an interior space of an aircraft. The cladding element is built up in a sandwich construction, that is to say by bringing to bear different layers in a planar manner on one another. The cladding element contains at least one core layer and one first cover layer. The first cover layer in the assembled state according to the intended use of the cladding element in the interior space forms a visible side of the cladding element. Therefore, the visible side after the assembly of the cladding element according to the intended use in an aircraft according to the intended use faces the interior space and can be seen by passengers, for example. An electrically heating layer is disposed between that core layer that is closest to the cover layer and the cover layer. The heating layer extends at least across a sub-face of the first cover layer. The heating layer serves for generating heat and for emitting the heat through the first cover layer, in the assembled state thus towards the interior space of the aircraft. The heating layer is thus heated when in operation, that is to say when supplied with electric power. Consequently, heat from the cladding element is dispensed from the visible side of the cladding element towards the interior space, or the passenger cabin, respectively. Since the heating layer (when viewed from the visible side) lies above the core layer, or above the topmost core layer in the case of the plurality of core layers, the heat dispersal of the heating layer is not compromised by any further core layer. The cover layer thus contains neither a complete (further) core layer nor part of a (further) core layer.

According to the disclosure herein, this thus results in a sandwich structure/sandwich construction having an embedded planar heating layer (in particular a heating element, heating paper, heating textile, or similar) for use in regions in the interior space (in particular in the aircraft cabin). According to the disclosure herein, this results in the technology for heating sandwich structures in a planar manner. The disclosure herein enables a cost-efficient solution with an ideally low system weight and energy consumption (low power take-up).

According to the disclosure herein, the relevant requirements in terms of the mechanical behavior, the fire safety requirements, and the resistance to moisture and media can be met.

According to the disclosure herein, this results in an active heating system which is implemented in particular by embedding a heating layer (heating paper) in the fiber-composite sandwich construction of the component (cladding element).

According to the disclosure herein, a heating layer (planar heating element, preferably heating paper or heating textile) is thus embedded in a single, double, or multiple sandwich construction (intermediate layers, preferably comprising fiber-composite materials, see below). The heating layer (for example, the heating fabric) herein does not lie directly on the visible side, in particular the surface visible to the passenger, but is situated below at least one tier, the first cover layer, and optionally intermediate layers, in particular glass-fiber-reinforced prepregs. On account thereof, the heating element is protected against mechanical influences. The cover tier on the visible side (the first cover layer) is in particular sanded, primed, and painted. The embedded elements (heating layer, conductor, connectors, see below) are not visible to the passenger; there is furthermore adequate electrical insulation in relation to a disruptive discharge.

In one preferred embodiment the cladding element contains at least one intermediate layer and/or a second cover layer that is opposite the first cover layer. The second cover layer is thus situated on the side counter to the visible side and in the assembled state thus faces the external wall of the aircraft. The cladding element is in particular further stabilized by corresponding further layers. The planar heating layer, or the heating element, can thus in particular be embedded in a multiple-layer (overall) cover tier (cover tier and intermediate layers) so as to protect the heating element against mechanical damage on account of impact. The heating layer, or the heating paper, is in particular embedded in the fiber-composite structure of the component on the visible side. The heat source (heating layer) is thus embedded close to the surface to be heated (first cover layer, visible side), on the one hand, and the heat source is protected against mechanical damage by in particular three tiers of a glass-fiber reinforced prepreg (first cover layer and two intermediate layers), on the other hand. This applies in particular to impact events in which it must be prevented that the energized heating layer (heating paper) represents a risk to passengers or the onboard crew. The system is highly energy-efficient on account of being embedded in the (overall) cover tier (in particular in the construction of first cover layer and two intermediate layers/heating layer/intermediate layer/core layer) on the passenger side, since the heat is made available close to the surface. At the same time, the heated surface on the rear side, on account of the core layer, preferably a sandwich honeycomb structure, is thermally insulated in relation to the cold external structure (aircraft hull).

In one preferred embodiment, the core layer contains a honeycomb core, or the core layer is a honeycomb core. The honeycomb core is in particular a Nomex honeycomb core, in particular having a thickness of 3 mm to 25.4 mm. Alternatively, the core layer can also be produced from foam. Particularly stable cladding elements can be achieved on account thereof.

In one preferred embodiment at least one of the cover layers (the first cover layer and/or—if present—the second cover layer) and/or—if present—one of the intermediate layers is a single-tier or multiple-tier (overall) layer from fiber-composite material. The layers or tiers, respectively, herein are in particular formed from prepreg material (pre-impregnated fibers). Cladding elements based on corresponding materials have been established in practice.

Therefore, the fiber-composite material in one preferred variant of the embodiment is a prepreg.

In one preferred embodiment the heating layer is perforated. The heating layer in the direction transverse to the area of extent thus has passage openings or breakouts, respectively, so as to achieve free conduits between the layers that are adjacent to the heating layer. Therefore, particularly in the case of prepregs, the binding agent (in particular resin) of the prepregs in the completely manufactured state penetrates the passage openings and forms a connecting column between the adjacent layers. A stable prepreg double plane having column-type connections thus results. The remaining (cavity) spaces between the layers are in this instance filled with the material of the heating layer.

In one preferred embodiment the heating layer contains or is a heating element that extends in a planar manner. The heating element is in particular a heating textile, in particular heating paper. Heating elements of this type are commercially available to meet the requirements. A heating paper based on carbon fibers embedded in a PEEK matrix is used in particular as a heating element. The carbon fibers herein are randomly oriented in the paper and have a multiplicity of short circuits. On account thereof, cutouts (breakouts of the perforation or comparatively large cutouts, etc.) can be performed in the heating paper without completely interrupting the current flow. This also enables the heating paper to be perforated so as to obtain embedding in the fiber-composite structures, or the improved embedding in the fiber-composite structures mentioned above, respectively. The sheet resistance and thus the heating output can be varied in particular by varying the proportion of the embedded carbon fibers.

In one preferred embodiment the cladding element contains at least one temperature sensor and/or at least one thermal fuse. The temperature sensor and the fuse herein are in each case thermally coupled to the heating layer. The fuse is in particular a reversible or a non-reversible fuse. The possibility for controlling the surface temperature (first cover layer) by way of an embedded sensor in conjunction with a closed-loop control system and for protecting the surface temperature against overheating results on account thereof. The surface temperature of the cladding element in the airborne state can thus in particular be controlled in the closed-loop manner to a nominal value of 19° C. with an accuracy of +/−2° C.

At least one temperature sensor is thus in particular embedded in the direct proximity of the heating layer (of the heating paper), the heating layer (the heating paper) being in particular controlled in a closed-loop manner by the temperature sensor. The sensor is preferably embodied as a PT100 sensor. In order to prevent any overheating of the panel, a reversible and/or non-reversible thermal fuse can thus be additionally incorporated.

In one preferred embodiment the temperature sensor, if present, is separated from the heating layer by an intermediate layer, in particular a tier of fiber-composite material. The intermediate layer is in particular a prepreg layer. A reliable separation between the heating layer and the temperature sensor is thus guaranteed while providing a positive thermal coupling.

In one preferred embodiment the cladding element contains at least one electrical connection element for electrically connecting the heating layer and/or, if present, the conductors and/or, if present, the temperature sensor and/or, if present, thermal fuse. The connection element is in particular an electric conductor or contact element. The contact element is in particular a plug, a socket, a clamp, a soldered/brazed joint etc. The contacting of the heating layer (of the heating paper) is thus in particular performed by way of suitable conductors. The conductors herein are in particular likewise embedded in the sandwich composite and connected in particular by way of a plug/socket, etc.

The contacting of the heating layer (of the heating paper) is in particular performed by way of copper strips which are integrated in the fiber-composite construction of the cladding element. The temperature sensor is in particular likewise contacted by way of embedded copper strips. The conductors of a wire by way of which the component is supplied are soldered/brazed on the respective side of the component. The heating paper (heating layer) on the sides is thus in particular provided with a copper electrode by way of which the heating paper can be connected.

In one preferred variant of this embodiment the cladding element has at least one pocket-hole type clearance which from the rear side of the cladding element in the transverse direction leads to at least one of the connection elements and which is sealed after the connection elements have been electrically connected. The electrical connection is in particular performed by connecting a cable; the sealing is performed by casting. The heating paper (heating layer), optionally the (temperature) sensor, as well as thermal fuses are thus contacted by way of an opening (clearance) on the panel (cladding element) and by way of the conductors. The opening is cast after the cable has been connected so as to prevent any ingress of moisture and media.

In one preferred embodiment the heating layer is thus electrically contacted at two opposite peripheral regions. The "periphery" herein is to be understood in terms of the planar direction of extent. The heating layer is thus passed through by a current flow in a planar manner from one end to another. The electrical contacting is in particular performed by conductor strips which run along the periphery.

In one preferred embodiment the heating layer between the peripheral regions has at least two portions (for example, central portion, lateral portion) which are electrically switched in series, wherein the portions differ in terms of at least one parameter. Depending on the geometry of the cladding element, the portions can be adapted so as to achieve an ideally complete coverage of the area while achieving an at least almost identical heating output per area. The switching in series is in particular performed by an electrically conducting transverse strip (connection element)

which extends across the entire width of the heating layer. A homogenization of the current density can in this instance be performed on both sides on the transverse strip. This embodiment is based on the concept that a locally increased heating output (hot spot) can arise by virtue of the higher local current flow in the case of comparatively large variations of the energized cross section of the heating layer, for example in the case of cut-out portions. Therefore, a plurality of portions (in particular blanks of heating paper) having adapted heating resistances are optionally switched in series in order to achieve a homogenous surface temperature.

In one preferred variant of this embodiment the parameter is a width and/or a thickness and/or an electrical property and/or a perforation parameter of the heating layer. The electrical property is in particular the electrical overall resistance, the electrical sheet resistance of the material (local, infinitesimal, proportion of electrically conducting fibers). The perforation parameter is in particular the number, size, the shape, the distribution pattern, or the area proportion of the perforations. Individual resistances, heating outputs, etc. can thus be set for the portions.

In one preferred embodiment the cladding element according to the intended use thereof is a cladding element for a location in an aircraft where there is insufficient installation space for an adequate passive thermal insulation of the interior space. The cladding element is in particular a wall cladding, floor cladding (floor plate). The location in the aircraft is in particular a door region, a region of the emergency exits. Thermal insulation is "adequate" when a surface temperature that is higher than a minimum temperature can be ensured in the operation according to the intended use. The cladding element is in particular a cladding element for covering an opening mechanism of an emergency exit door of the aircraft. A "door" here is also to be understood to be a hatch, a wall element, etc. A mechanism is in particular an articulation and/or a hook structure to which the door is anchored, or on which the door is mounted so as to be movable and/or removable, respectively.

According to the disclosure herein, this thus results in a heated cladding element in the region of the emergency exit of commercial aircraft, a heated cladding element in the region of the door/door frame cladding of commercial aircraft, or a heated floor plate for aircraft cabins.

The disclosure herein is based on the following concepts, observations or considerations, respectively, and also has the following embodiments. The embodiments herein in a simplifying manner are to some extent also referred to as "the disclosure herein". The embodiments herein can also contain parts or combinations of the embodiments mentioned above, or correspond to the embodiments mentioned above, and/or optionally also include embodiments not yet mentioned.

The disclosure herein is based on the concept of achieving a solution for a heated lining in the region of the aircraft cabin.

The disclosure herein is based on the concept of embedding planar heating elements in a sandwich construction, including the embedded electrical conductors, fuses, and sensors. The heating layer (the heating paper) thus lies in the sandwich so as to be protected against mechanical influences (in particular against impact events). Various sandwich constructions (different cover tiers and different core materials, depending on the structural requirements) can be considered herein.

According to the disclosure herein, thermal comfort for passengers can be implemented by way of a minimal installation space and at the same time a comparatively minor weight. This is highly interesting in particular in regions where there is little volume available for the rear-side (passive thermal) insulation of cladding components, such as in the door region or in the region of the emergency exits. A robust integrated solution which withstands the harsh stresses in the region of the passenger cabin (passenger loads, impact events, abuse loads, etc.) is implemented on account of the construction according to the disclosure herein, without losing functional capability or endangering the safety of crew and passengers (for example, short circuits or exposed energized conductors). Moreover, this integrated solution is advantageous in terms of withstanding aggressive media such as, for example, hydraulic fluid or cleaning agents, and has a positive fire behavior.

BRIEF DESCRIPTION OF THE DRAWINGS

Further features, effects, and advantages of the disclosure herein are derived from the description hereunder of a preferred example embodiment of the disclosure herein as well as from the appended, example figures. In the figures, in each case in a schematic diagram.

DETAILED DESCRIPTION

Figure 1:
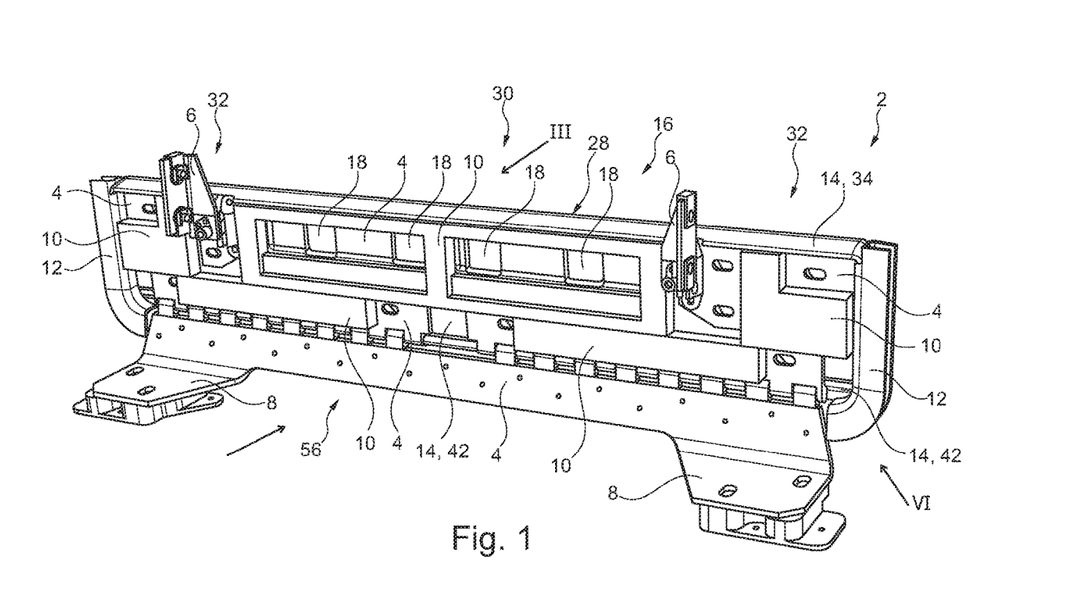
FIG. 1 shows a structural part of an aircraft having a cladding element in a perspective view.

FIG. 1 shows a structural part 2 of an aircraft, presently a folding mechanism for an emergency exit not explained in more detail. The structural part 2 contains substantially a metallic frame 4 in the form of an articulated support structure to which holders 6 and connecting tabs 8 for the emergency exit are fastened in a mechanically stable manner. An insulation 10 in the form of insulation foam is attached where this is possible in terms of construction. However, in the assembled state according to the intended use there is insufficient installation space available for attaching an insulation 10 in an adequate quantity or across an adequate area, respectively. Therefore, an adequate passive thermal insulation of an interior space 16 is not provided on the structural part 2. The structural part 2 is partially surrounded by a silicone seal 12. The structural part 2 on the side that in FIG. 1 faces away from the observer is covered by a cladding element 14.

The cladding element 14 in the assembled state faces the interior space 16 of the aircraft. The structural part 2 including the cladding element 14 is penetrated by a total of four viewing windows 18 so as to in the assembled state enable the view from the interior space 16 to critical structural parts of the emergency exit (not illustrated) when necessary.

Figure 2:
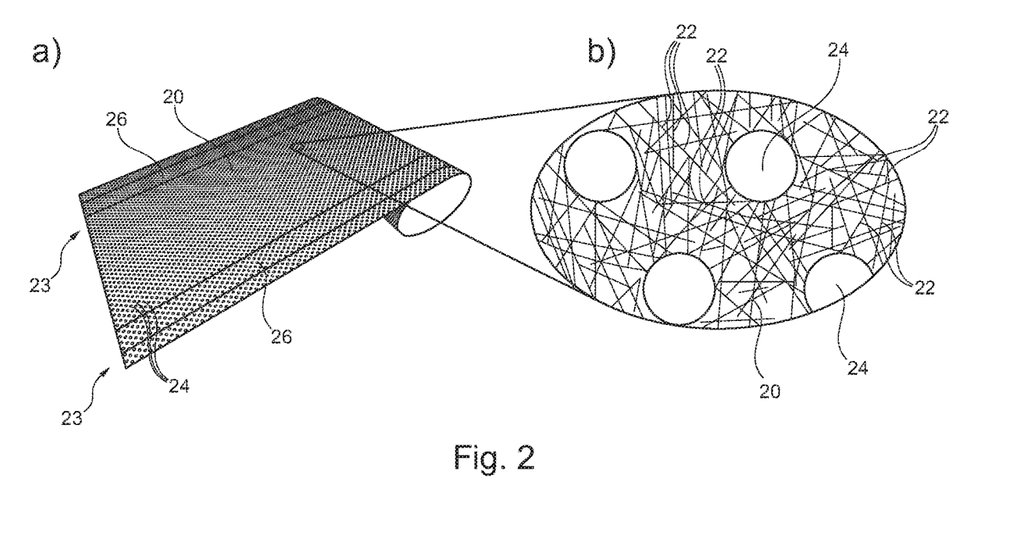
FIG. 2 shows an electrically heating layer having electrodes in detail in a) a perspective view and b) in a plan view.

FIG. 2 shows an electrically heating layer 20, presently in the form of a heating paper. This herein is a PEEK matrix having embedded carbon fibers 22. B) of FIG. 2 herein shows the encircled detail in a) of FIG. 2. The heating layer 20 has a perforation in the form of a multiplicity of breakouts 24. The heating layer 20 on two opposite peripheral sides, or peripheral regions 23, respectively, has in each case one electrical connection element 26 in the form of a copper electrode. The breakouts 24, or the perforation, respectively, continue/continues also into the copper electrode. The heating paper has an area weight of 85 g/sqm, a sheet resistance of 10 to 600 Ohm/sqr, and a thickness of 90 micrometers. The respective copper electrode is 20 mm wide and 20 micrometers thick. The perforated surface occupies a proportion of 18% of the area. The heating layer 20 is one of a plurality of layers of the cladding element 14 which is produced in a sandwich construction.

Figure 3:
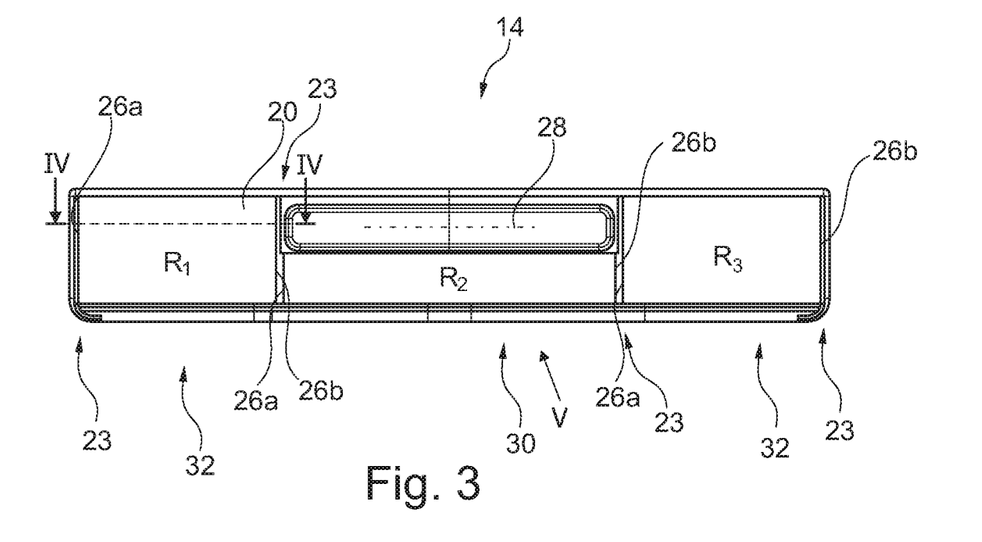
FIG. 3 shows the cladding element from FIG. 1 in a section through the layers.

FIG. 3 shows a longitudinal section through the cladding element 14 according to FIG. 1 at the level of the heating layer 20, when viewed in the direction of the arrow III in FIG. 1. In order to achieve space for region 28 in which the viewing windows 18 are disposed, a first portion in the form of a central portion 30 of the heating layer 20 is embodied so as to have a reduced width in comparison to the second and third portions in the form of lateral portions 32 of the heating layer 20. Connection elements 26a, 26b in the form of the above-mentioned copper electrodes are to be found in each case at the end sides of the heating layer 20.

In the operation of the heating layer 20, a current by way of the connection element 26a is directed into the heating layer 20 and by way of the connection element 26b is again directed out of the heating element 20 (or vice versa).

In the case of a heating layer continuing in a homogenous manner and having a uniform local electrical sheet resistance, locally increased heating of the central portion 30 in relation to the lateral portions 32 would result in operation because of a local increase in the current density in the region of the central portion 30. For this reason, the heating layer 20 is embodied in three parts, wherein the electrical overall resistances R1=R3 are identical due to the symmetry of the lateral portions 32, and the resistance of the central portion 30 R2<R1 is embodied so as to be relatively smaller. In the event of a current flow a homogenous temperature distribution thus results in the entire heating layer 20.

The heating layer 20 is therefore assembled from the three sub-portions 30, 32 which are in each case connected on one side by way of connection elements 26. Connection elements 26 that are in each case contiguous herein are electrically connected to one another. This thus results in the portions 32—30-32 being electrically switched in series.

Figure 4:
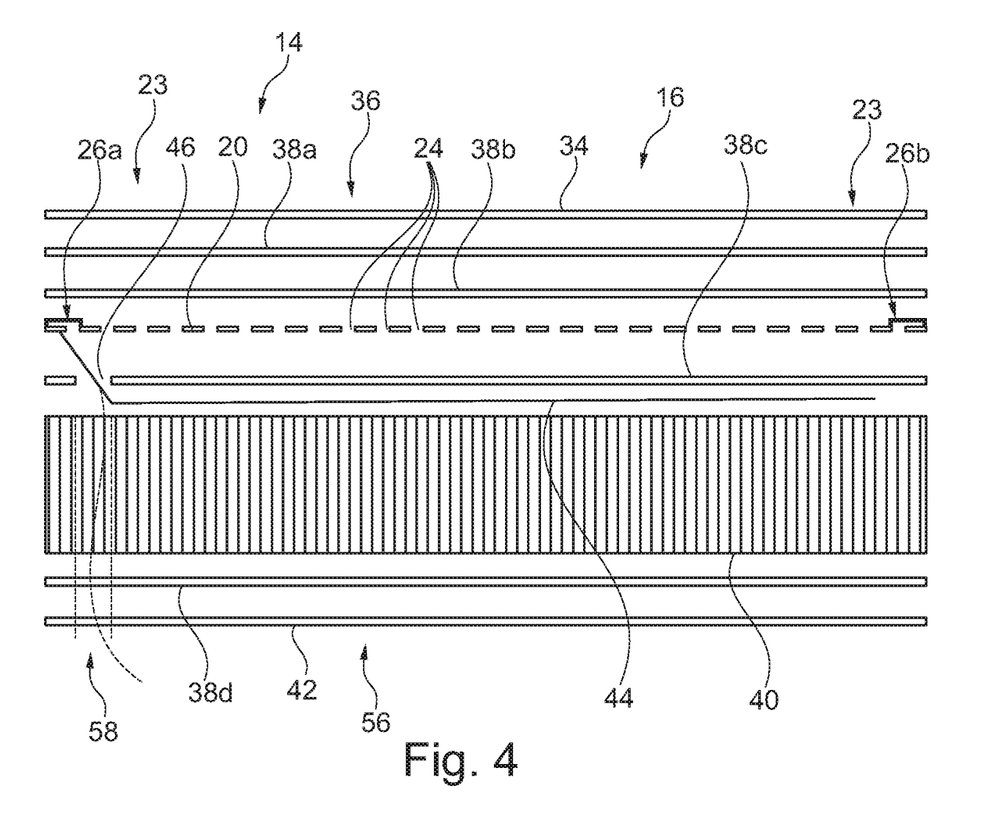
FIG. 4 shows the layered construction of the cladding element from FIG. 1 in the cross section.

FIG. 4 shows a cross section along the symbolically indicated line IV-IV in FIG. 3 through the entire cladding element 14. The cladding element 14 towards the interior space 16 (assembled state according to the intended use) has a cover layer 34 which forms a visible side 36 of the cladding element 14. Conjointly with two intermediate layers 38a and 38b, a three-tier construction thus results. The cover layer 34 as well as the intermediate layers 38a, 38b are glass-fiber prepreg tiers.

The heating layer 20 follows as the next layer, and thereafter a further intermediate layer 38c. A core layer 40, presently a Nomex honeycomb core in the form of a honeycomb, or of a honeycomb core, follows thereafter. A further intermediate layer 38d as well as a second cover layer 42, likewise a glass-fiber prepreg, complete the construction.

The layered construction can thus be summarized as follows: three tiers of glass-fiber prepregs having in each case a thickness of 0.25 mm are provided on the visible side. The heating paper in the form of the heating layer 20 is situated below the three tiers, and then again one tier of the glass-fiber prepreg. Situated therebelow is the core layer 40, and finally once again two tiers of glass-fiber prepregs on the rear side. The prepreg is of the PHG600-68-37 type. In the context of the disclosure herein the three-tier layer from a first cover layer 34 and the two intermediate layers 38 could also be understood as a three-tier (single cover) layer from fiber-composite material. The same applies to the intermediate layer 38d and the second cover layer 42 as a two-tier (single cover) layer.

FIG. 4 moreover shows an electrical conductor 44 for connecting the connection element 26a the electrical conductor 44 being spaced apart from the connection element 26a by the respective intermediate layer 38c and running so as to be electrically isolated in the interior of the cladding element 14. The conductor 44 is also referred to as the "return copper strip".

FIG. 4 in an alternative embodiment shows in dashed lines how a pocket-hole type clearance 58 for electrically contacting components, presently the conductor 44, is incorporated in the cladding element 14, from a rear side 56 of the cladding element 14 in the transverse direction of the cladding element 14, so as to reach the respective component. After the contacting which here is likewise indicated by dashed lines, the clearance 58 is then cast or sealed, respectively, so as to be tight in relation to environmental influences.

Figure 5:
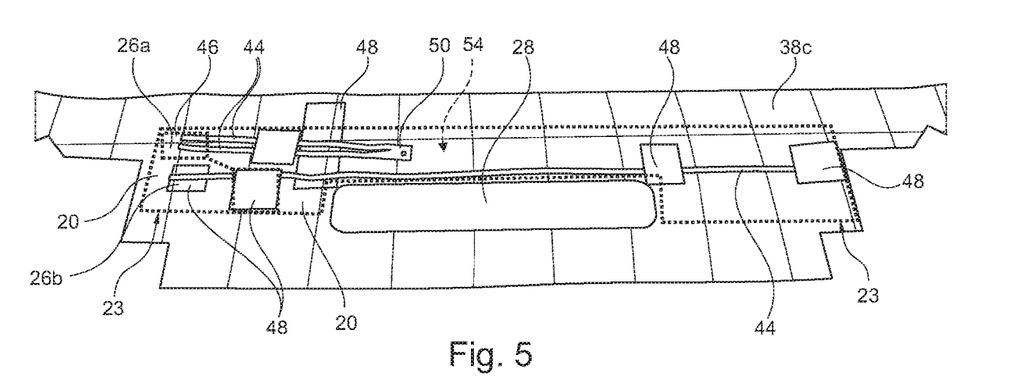
FIG. 5 shows a partial construction of the structural part from FIG. 1 prior to the completion in a perspective view.

FIG. 5 shows a plan view of the intermediate layer 38c having the invisible heating layer 20 lying therebelow, presently indicated by dashed lines. The respective peripheral regions of the intermediate layer 38c in the final assembly are in each case folded over along the periphery such that the shape of the cladding element 14 finally results. A cutout 46 (cf. also FIG. 4) for electrically contacting the heating layer 20 is incorporated in the intermediate layer 38c, of which the one above the connection element 26b that has not yet been contacted is visible in the figure. By contrast, the connection element 26a has already been contacted and subsequently been adhesively covered by an insulation film 48.

Moreover, a temperature sensor 50 having respective conductor leads 44 is disposed on the intermediate layer 38c and is likewise adhesively bonded or fixed, respectively, by an insulation film 48. On account thereof, the current temperature of the cladding element 14, or of the heating layer 20, respectively, can be detected at all times. In an alternative embodiment, a thermal fuse 54, not presently illustrated, can also be installed in the structural part 2 (component) (an exemplary installation location is indicated in the figure). Such a thermal fuse 54 is incorporated in addition to the temperature sensor 50 so as to guarantee an additional degree of safety.

Figure 6:
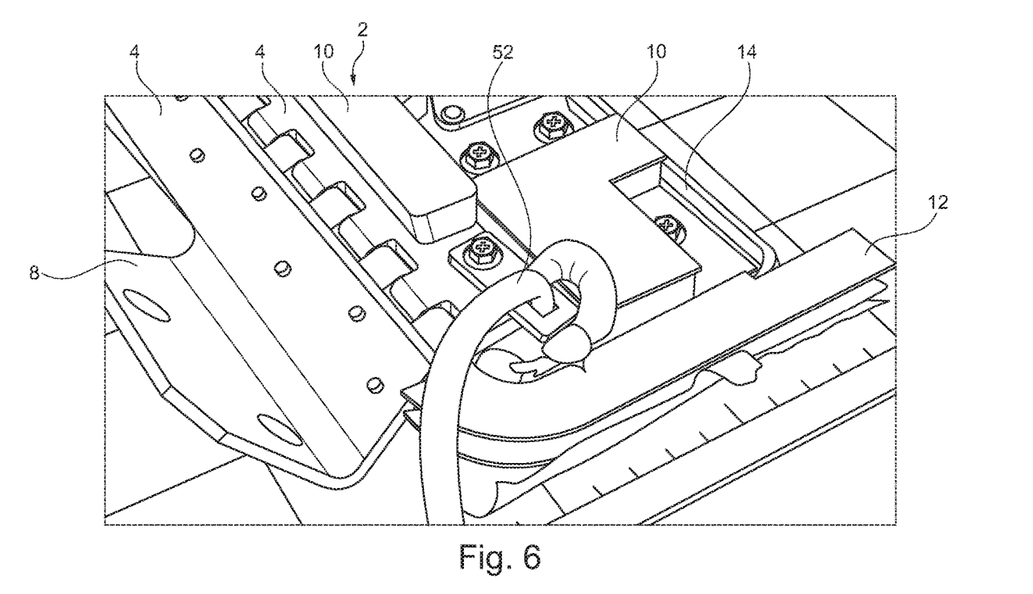
FIG. 6 shows a detail of the electrically connected structural part from FIG. 1 in a perspective view.

FIG. 6 finally shows the electrically contacted structural part 2 in which (not visible in the figure) the temperature sensor 50 as well as the connection elements 26a, 26b, or the conductors 44 leading to the elements, respectively, are contacted with the aid of the connector cable 52 shown.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A cladding element for an interior space of an aircraft, the cladding element comprising:
   a first cover layer forming a visible side of the cladding element;
   an electrically heating layer extending across at least a sub-face of the first cover layer and serving for generating heat for emission through the first cover layer;
   two intermediate layers that are sandwiched between the electrically heating layer and the first cover layer;
   a further intermediate layer that is positioned on an opposite side of the electrically heating layer from the two intermediate layers, such that the electrically heating layer is sandwiched directly between one of the two intermediate layers and the further intermediate layer;
   at least one core layer disposed such that the electrically heating layer is sandwiched between the at least one core layer and one of the two intermediate layers; and
   an electrical conductor that is electrically connected to the electrically heating layer;
   wherein the two intermediate layers are formed from a fiber-composite material;
   wherein a first portion of the electrical conductor is sandwiched directly between the at least one core layer and the further intermediate layer;
   wherein a second portion of the electrical conductor passes through a cutout formed in the further intermediate layer, such that the second portion of the electrical conductor electrically contacts the electrically heating layer; and
   wherein the first cover layer, the electrically heating layer, the at least one two intermediate layers, and the at least one core layer are arranged such that the cladding element has a sandwich construction.

2. The cladding element according to claim 1, comprising a second cover layer that is opposite the first cover layer with respect to the electrically heating layer and the at least one core layer.

3. The cladding element according to claim 2, wherein at least one of the first cover layer and the second cover layer is a multiple-tier layer formed from a fiber-composite material.

4. The cladding element according to claim 3, wherein:
   the fiber-composite material is a prepreg; and/or
   each of the first cover layer, the at least two intermediate layers, and the second cover layer is a multiple-tier layer formed from a fiber-composite material.

5. The cladding element according to claim 4, wherein the fiber-composite material is a prepreg.

6. The cladding element according to claim 4, comprising a second further intermediate layer that is sandwiched directly between the at least one core layer and the second cover layer.

7. The cladding element according to claim 1, wherein the at least one core layer contains a honeycomb core or is a honeycomb core.

8. The cladding element according to claim 1, wherein the first cover layer is a multiple-tier layer formed from the fiber-composite material.

9. The cladding element according to claim 8, wherein the fiber-composite material is a prepreg.

10. The cladding element according to claim 1, wherein:
    the heating layer is perforated; and/or
    the heating layer contains or is a heating element that extends in a planar manner.

11. The cladding element according to claim 1, wherein the cladding element contains at least one temperature sensor and/or at least one thermal fuse which are or is thermally coupled to the heating layer.

12. The cladding element according to claim 11, wherein the temperature sensor is separated from the heating layer by the at least two intermediate layers.

13. The cladding element according to claim 11, wherein the cladding element contains at least one electrical connection element for electrically connecting the heating layer and/or conductors and/or the temperature sensor and/or the thermal fuse.

14. The cladding element according to claim 13, wherein the cladding element has at least one pocket-hole type clearance which from a rear side of the cladding element in a transverse direction leads to at least one of the connection elements and which is sealed after the connection elements have been electrically connected.

15. The cladding element according to claim 1, wherein the heating layer is electrically contacted at two opposite peripheral regions.

16. The cladding element according to claim 15, wherein the heating layer between the two opposite peripheral regions has at least two portions which are electrically switched in series, wherein the at least two portions differ in terms of at least one parameter.

17. The cladding element according to claim 16, wherein the at least one parameter is a width and/or a thickness and/or an electrical resistance and/or a perforation parameter of the heating layer.

18. The cladding element according to claim 1, wherein the cladding element is a cladding element for a location in an aircraft where there is insufficient installation space for an adequate passive thermal insulation of the interior space.

19. The cladding element according to claim 1, wherein the at least one core layer is produced from foam.

20. A structural part in a form of a folding mechanism for an emergency exit of an aircraft, the structural part comprising:
    a metallic frame in a form of an articulated support structure to which holders and connecting tabs for the emergency exit are fastened in a mechanically stable manner;
    a cladding element that is attached to the metallic frame to face an interior space of the aircraft, the cladding element comprising:
      a first cover layer forming a visible side of the cladding element;
      an electrically heating layer extending across at least a sub-face of the first cover layer and serving for generating heat for emission through the first cover layer;
      two intermediate layers that are sandwiched between the electrically heating layer and the first cover layer;
      a further intermediate layer that is positioned on an opposite side of the electrically heating layer from the two intermediate layers, such that the electrically heating layer is sandwiched directly between one of the two intermediate layers and the further intermediate layer;

at least one core layer disposed such that the electrically heating layer is sandwiched between the at least one core layer and one of the two intermediate layers; and an electrical conductor that is electrically connected to the electrically heating layer;

wherein the two intermediate layers are formed from a fiber-composite material;

wherein a first portion of the electrical conductor is sandwiched directly between the at least one core layer and the further intermediate layer;

wherein a second portion of the electrical conductor passes through a cutout formed in the further intermediate layer, such that the second portion of the electrical conductor electrically contacts the electrically heating layer; and wherein the first cover layer, the electrically heating layer, the two intermediate layers, and the at least one core layer are arranged such that the cladding element has a sandwich construction; and at least one viewing window that penetrates the structural part, including the cladding element, to allow a view from the interior space of the aircraft, through the at least one viewing window, through the structural part.

* * * * *

UNITED STATES PATENT AND TRADEMARK OFFICE
CERTIFICATE OF CORRECTION

| | | |
|---|---|---|
| PATENT NO. | : 12,179,905 B2 | |
| APPLICATION NO. | : 16/691821 | |
| DATED | : December 31, 2024 | |
| INVENTOR(S) | : Rainer Müller et al. | |

It is certified that error appears in the above-identified patent and that said Letters Patent is hereby corrected as shown below:

In the Claims

Column 9 Line 40: "the at least one two intermediate layers, and the at least" should be -- the two intermediate layers, and the at least --.

Column 9 Line 53: "each of the first cover layer, the at least two intermediate" should be -- each of the first cover layer, the two intermediate --.

Column 10 Line 13: "the at least two intermediate layers." should be -- the two intermediate layers --.

Signed and Sealed this
Fifth Day of August, 2025

Coke Morgan Stewart
*Acting Director of the United States Patent and Trademark Office*